(12) United States Patent
Kalliske et al.

(10) Patent No.: US 9,073,513 B2
(45) Date of Patent: Jul. 7, 2015

(54) GAS BAG ARRANGEMENTS FOR A MOTOR VEHICLE

(75) Inventors: Ingo Kalliske, Potsdam (DE); Marco Porstmann, Glienicke/Nordbahn (DE); Thomas Lube, Berlin (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/981,811

(22) PCT Filed: Jan. 26, 2012

(86) PCT No.: PCT/EP2012/051190
§ 371 (c)(1),
(2), (4) Date: Oct. 14, 2013

(87) PCT Pub. No.: WO2012/101198
PCT Pub. Date: Aug. 2, 2012

(65) Prior Publication Data
US 2014/0034406 A1 Feb. 6, 2014

(30) Foreign Application Priority Data

Jan. 27, 2011 (DE) .......................... 10 2011 010 263
Aug. 31, 2011 (DE) .......................... 10 2011 081 889
Oct. 27, 2011 (DE) .......................... 10 2011 085 330
Nov. 25, 2011 (DE) ..................... 20 2011 052 110 U

(51) Int. Cl.
*B60K 28/10* (2006.01)
*B60R 21/36* (2011.01)
(Continued)

(52) U.S. Cl.
CPC ................. *B60R 21/36* (2013.01); *B60R 21/34* (2013.01); *B60R 21/2176* (2013.01); *B60R 2021/0027* (2013.01)

(58) Field of Classification Search
USPC .......................... 180/274, 69.21; 296/193.11
IPC ............................................. B60R 21/34,21/38
See application file for complete search history.

(56) References Cited

U.S. PATENT DOCUMENTS 6,131,949 A   10/2000   Lewis et al. ................... 280/739
6,182,782 B1   2/2001   Matsuura et al. ............. 180/274
(Continued)

FOREIGN PATENT DOCUMENTS

CN        1931638 A     3/2007
CN      101341049 A     1/2009
(Continued)

OTHER PUBLICATIONS

Japanese examination report Oct. 16, 2014.
(Continued)

*Primary Examiner* — Faye M. Fleming
(74) *Attorney, Agent, or Firm* — L.C. Begin & Associates, PLLC.

(57) ABSTRACT

A gas bag arrangement for a motor vehicle is provided. The gas bag comprises a gas bag which can be deployed for the protection of a person present outside the vehicle along at least a section of the front window and/or another portion of an outside of the motor vehicle and a housing in which the gas bag is arranged, wherein the housing is different from a cover of a receiving region of the motor vehicle extending before the front window. The housing is designed such that it at least partly covers the gas bag towards the cover of the motor vehicle-based on the condition of the gas bag arrangement mounted in the vehicle.

20 Claims, 8 Drawing Sheets

(51) Int. Cl.
  *B60R 21/34* (2011.01)
  *B60R 21/217* (2011.01)
  *B60R 21/00* (2006.01)

(56) References Cited

U.S. PATENT DOCUMENTS

| | | | |
|---|---|---|---|
| 6,474,679 B2 * | 11/2002 | Miyasaka et al. | 280/730.1 |
| 6,497,302 B2 * | 12/2002 | Ryan | 180/274 |
| 6,668,962 B2 * | 12/2003 | Son | 180/274 |
| 6,938,715 B2 * | 9/2005 | Hamada et al. | 180/274 |
| 7,021,656 B2 * | 4/2006 | Okamoto et al. | 280/739 |
| 7,527,121 B2 * | 5/2009 | Kitte et al. | 180/274 |
| 7,681,914 B2 | 3/2010 | Maidel et al. | 280/739 |
| 7,690,680 B2 | 4/2010 | Meissner et al. | 280/736 |
| 7,857,087 B2 * | 12/2010 | Matsuura et al. | 180/274 |
| 8,006,997 B2 * | 8/2011 | Inoue et al. | 280/728.2 |
| 8,016,066 B1 * | 9/2011 | Boxey | 180/271 |
| 8,235,159 B2 * | 8/2012 | Mildner | 180/274 |
| 2002/0074775 A1 | 6/2002 | Ryan | 280/728.2 |
| 2003/0178239 A1 | 9/2003 | Takimoto | 180/274 |
| 2005/0218632 A1 | 10/2005 | Cuevas et al. | |
| 2005/0257979 A1 | 11/2005 | Hamada et al. | 180/274 |
| 2006/0122535 A1 | 6/2006 | Daum | 600/565 |
| 2007/0040366 A1 | 2/2007 | Maidel et al. | 280/739 |
| 2009/0066067 A1 | 3/2009 | Meissner et al. | 280/735 |
| 2009/0066069 A1 | 3/2009 | Takahashi et al. | 280/43.1 |
| 2009/0200778 A1 | 8/2009 | Ishikawa et al. | 280/739 |
| 2010/0307854 A1 | 12/2010 | Mildner | 180/274 |

FOREIGN PATENT DOCUMENTS

| | | | |
|---|---|---|---|
| CN | 101374699 A | 2/2009 | |
| CN | 101754889 A | 6/2010 | |
| DE | 10138449 A1 | 2/2003 | |
| EP | 1 992 526 A2 | 11/2008 | B60R 21/16 |
| JP | 08276816 | 10/1996 | |
| JP | 2004-168111 | 6/2004 | |
| JP | 2004175154 A | 6/2004 | B60R 21/00 |
| JP | 2004299517 A | 10/2004 | B60R 21/00 |
| JP | 2005-297725 | 10/2005 | |
| JP | 2006-044322 | 2/2006 | |
| JP | 2010-076655 | 4/2010 | |

OTHER PUBLICATIONS

CN Office Action, Dated Mar. 18, 2015.

\* cited by examiner

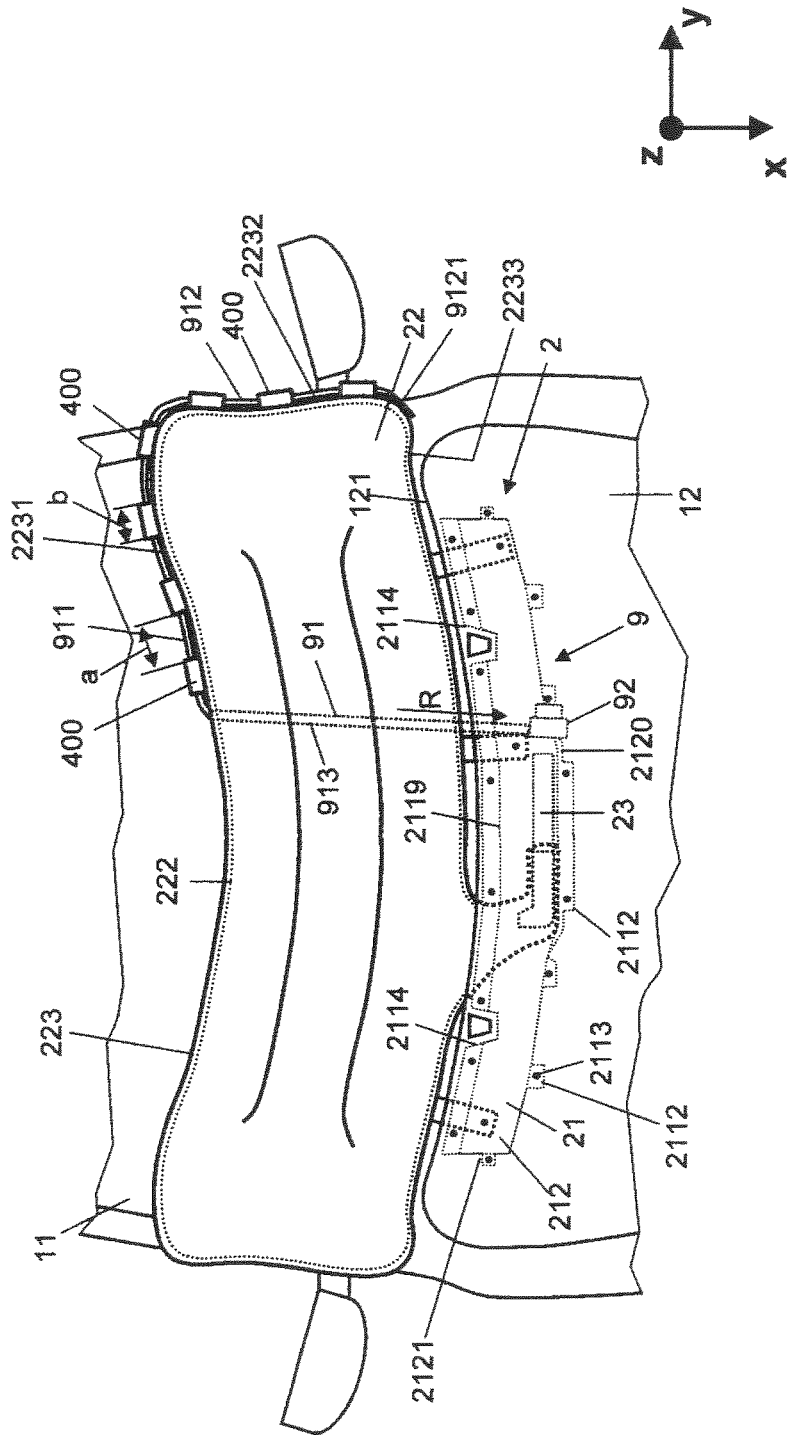

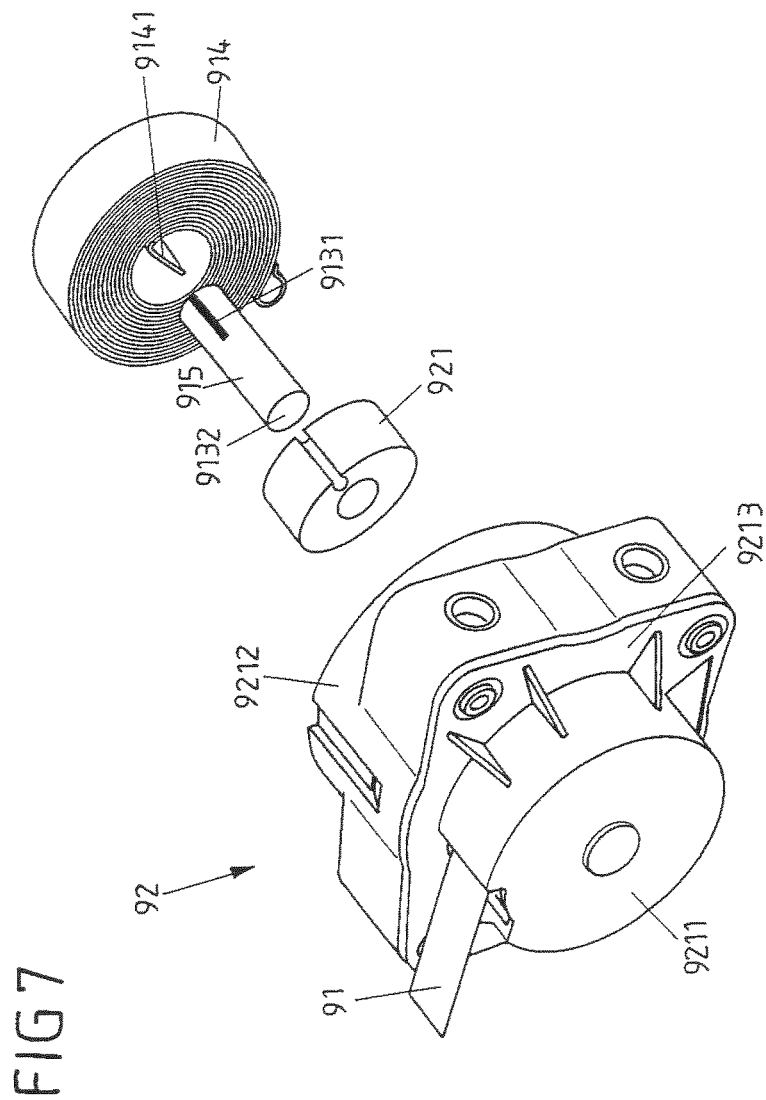

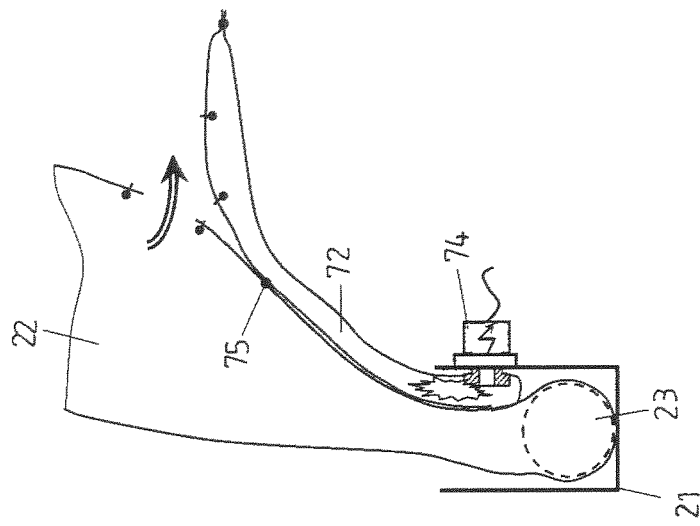
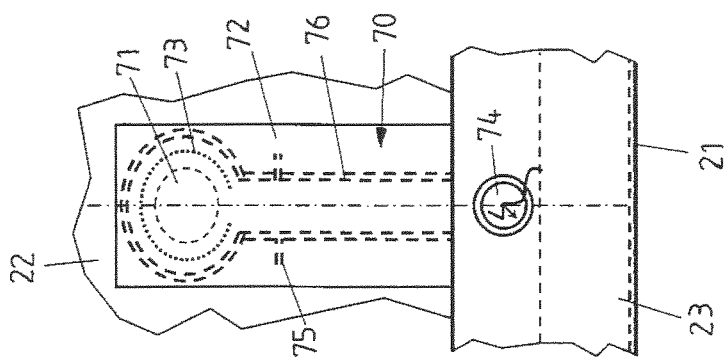
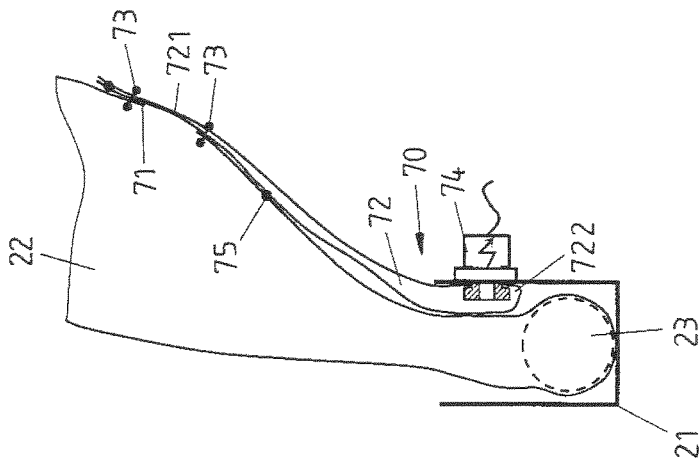

GAS BAG ARRANGEMENTS FOR A MOTOR VEHICLE

CROSS-REFERENCE TO A RELATED APPLICATION

This application is a National Phase Patent Application of International Patent Application Number PCT/EP2012/051190, filed on Jan. 26, 2012, which claims priority of German Patent Application Number 10 2011 010 263.9, filed on Jan. 27, 2011, of German Patent Application Number 10 2011 081 889.8, filed on Aug. 31, 2011, of German Patent Application Number 10 2011 085 330.8, filed on Oct. 27, 2011 and of German Utility Model Application Number 20 2011 052 110.9, filed on Nov. 25, 2011.

BACKGROUND

This invention relates to a gas bag arrangement for a motor vehicle.

From the prior art, there are known gas bag arrangements which include an inflatable gas bag for the protection of pedestrians, which in the inflated condition extends along the vehicle front, in particular along the windshield of the vehicle, in order to dampen an impact of the pedestrian onto this vehicle region in the case of a collision of the vehicle with the pedestrian. Such gas bag arrangement is described for example in EP 1 349 752 B1.

SUMMARY

The problem underlying the invention consists in creating a gas bag arrangement for the protection of a pedestrian or another person present outside the vehicle, which can be mounted in the vehicle in a way as simple and cost-saving as possible.

According to an exemplary embodiment of the invention, in a first aspect of the invention a gas bag arrangement for a motor vehicle is provided, comprising
   a gas bag which for the protection of a person present outside the vehicle can be deployed along at least a section of the front window and/or another portion of an outside of the motor vehicle;
   a housing in which the gas bag is arranged, wherein the housing is different from a cover of a receiving region of the motor vehicle extending in front of the front window; and wherein
   the housing is designed such that it at least partly covers the gas bag towards the cover of the motor vehicle-based on the condition of the gas bag arrangement mounted in the vehicle.

The cover for example is a hood which covers an engine compartment of the vehicle. The cover can, however, also cover e.g. a trunk provided in the front region of the vehicle, if the vehicle engine is located in the rear of the vehicle.

The housing of the gas bag arrangement according to the invention at least partly encloses the gas bag also in the region of the cover, which protects the gas bag and possibly further components which are accommodated in the housing, in particular against environmental influences (such as moisture and/or dust) and e.g. at the same time secures the position of the folded gas bag. Thus, the gas bag arrangement according to the invention can be preassembled and in the preassembled condition up to the assembly at the vehicle can be handled without additional measures, so that there is no necessity to fix the gas bag arrangement in the vehicle (at the cover) directly after its manufacture. This reduces e.g. the logistical effort during manufacture of a vehicle. It is also conceivable that the housing completely encloses the gas bag.

The housing for example comprises a first and a second housing part, wherein the first housing part includes an opening for introducing the gas bag into the housing and the second housing part at least partly covers the opening in the first housing part and after assembly of the gas bag arrangement in the motor vehicle covers the gas bag towards the cover, i.e. is at least partly located between the first housing part and the cover (e.g. the hood of the vehicle). It is of course conceivable that the second housing part completely covers the opening for introducing the gas bag and e.g. tightly closes the same. In addition, after assembly of the gas bag arrangement in the vehicle, the second housing part can extend at least approximately parallel to the cover.

According to another exemplary development of the invention, the first housing part is formed with a higher dimensional stability than the second housing part, i.e. the first housing part is formed of a less bendable material than the second housing part. For example, the second housing part is a film (e.g. a plastic film, but a metal foil would also be conceivable), which e.g. has a thickness of less than 1 mm or less than 0.5 mm (e.g. about 0.2 mm).

The first housing part in particular is connected with the second housing part, wherein the connection between the two housing parts is realized e.g. by cohesion, for example by a welded or adhesive connection. The connection between the first and the second housing part in particular is made tight, so that a penetration of moisture and/or foreign objects (dust) into the housing is counteracted. The first housing part for example is formed of metal or plastic (for example in one piece).

According to another exemplary aspect of the invention, the first housing part forms a receptacle defined by a bottom and a side wall protruding from the bottom at an angle or vertically, in which the gas bag is arranged. In particular, the first housing part is formed trough-like, i.e. with a circumferential side wall which protrudes from a bottom (e.g. extending substantially planar).

In addition, it can be provided that the first housing part includes a tear region which under the pressure of the deploying gas bag clears an opening through which the gas bag can exit from the housing. It is conceivable, for example, that the tear region is formed by a weakening (e.g. in the form of a perforation and/or a material thinning) of the material of the first housing part. For example, the tear region is formed by a weakening of a side wall and/or a bottom of the first housing part. The weakening (or the plurality of weakenings) in particular extends at least partly line-shaped (e.g. linearly).

It is also conceivable that the weakening forming the tear region extends adjacent to an opening in the first housing part, which serves for introducing the gas bag into the housing (see above). For example, the distance between the weakening and the opening in the first housing part, which is covered by the second housing part, is less than 10 mm.

According to another exemplary development of the invention, the first housing part includes at least one fastening structure, via which it is connectable with the vehicle (in particular with the hood). For example, the fastening structure is formed in the form of a mounting hole, through which e.g. a threaded bolt protruding from the hood or a latching element can be guided and the gas bag arrangement thus is screwed to or latched with a portion of the hood. In addition, the hood can include fastening structures forming an undercut, into which the first housing part is pushed during assembly. As a result, for example, the above-mentioned fastening structures can be reduced in their number, since a correspondingly designed circumferential attachment no longer is necessary.

According to another exemplary aspect of the invention, the gas bag includes a plurality of chambers which are separated from each other by at least one flexible separating element. For example, the flexible separating element is designed in the form of a catch strap.

For example, the gas bag includes at least one first, second and third chamber, which in the deployed condition of the gas bag extend one behind the other along the windshield of the vehicle, wherein the second chamber is located between the first and the third chamber and the second chamber e.g. is separated from the first chamber via a first separating element and from the third chamber via a second separating element. For example, the first separating element extends at least approximately along a first plane and the second separating element extends along a second plane oriented at an angle to the first plane.

It is also conceivable that the first and the second separating element with a first portion each are connected with the gas bag at portions of an inside of the gas bag spaced from each other and with a second portion overlap or are identical with sections of the inside of the gas bag, which adjoin each other. For example, the first and the second separating element form a "V" as seen in a sectional view (section along a plane defined by the longitudinal vehicle direction and the vehicle height direction) and based on the inflated condition of the gas bag.

The first and the second separating element e.g. are two separate separating elements (e.g. catch straps). It is, however, also possible that the first separating element is integrally connected with the second separating element, i.e. the first and the second separating element are formed by different portions of a continuous separating element (e.g. a catch strap).

The gas bag arrangement furthermore can include a gas generator for inflating the gas bag and a flexible gas conducting means extending in the interior of the gas bag for conducting the gas generated by the gas generator. For example, the flexible gas conducting means, which is formed e.g. like a hose of a gas bag material, extends from the gas generator into one or more chambers of the gas bag. It is also conceivable that between the flexible gas conducting means and the gas generator a further, rigid gas conducting means is located, via which the gas generator is connected with the flexible gas conducting means in a gas-conducting manner.

The gas bag arrangement according to an exemplary embodiment of the invention also can include a means for moving at least a section of the inflated gas bag out of the field of view of the vehicle operator. It is conceivable that the means for moving includes at least one connecting element which is directly connected both with the gas bag and with the vehicle, wherein the connecting element is formed elastic or the gas bag arrangement includes restoring force generating means, via which the connecting element then is indirectly connected with the vehicle.

The means for moving is arranged e.g. on the driver side (of course also possible on driver and passenger side) and after the deployment of the gas bag and a possible impact of a pedestrian provides for the forward view, especially for the vehicle operator. The means for moving can be designed to be self-controlling. It is also possible that the means for moving is actuated by a control unit (Electronic Control Unit—ECU) and activated via the ECU.

The restoring force generating means for example include a retraction mechanism, which in particular is arranged in the housing of the gas bag arrangement. In the case of a self-controlling design, the retraction mechanism for example might include a winding spool on which the connecting element is at least partly wound up before deployment of the gas bag and which cooperates with a spiral spring. During deployment of the gas bag a force is produced by the pressure building up in the gas bag interior, which force is transmitted to the winding spool by the connecting element and tensions the spiral spring. The spiral spring is unwound in the process. When the gas bag internal pressure decreases, the force transmitted to the winding spool is reduced. The spiral spring is wound up again (is tensioned) and pulls the connecting element and hence the gas bag back from the field of view of the vehicle operator. In an ECU-controlled retracting means e.g. an actuator is provided, via which the connecting element can be moved. As actuator, an electric motor which drives a winding spool or a pyrotechnically driven piston-cylinder unit can be provided, for example.

The means for moving is of course not limited to these configurations. Other realizations, as they are described for example in the German Patent Application DE 10 2011 010 263.9 of 27 Jan. 2011 are also conceivable. In so far, reference is made herewith expressly to DE 10 2011 010 263.9.

In another exemplary aspect of the invention, the gas bag arrangement includes a means for lowering the internal pressure in the gas bag. The means for lowering the internal pressure for example also can impart another course to the decrease of the gas bag internal pressure after a specifiable time, concretely e.g. a faster lowering can be enforced, so that e.g. for moving (retracting) the gas bag by means of the above-described means for moving the gas bag lower forces must be applied. The means for lowering the gas bag internal pressure for example likewise can be designed to be self-controlling (e.g. as self-adaptive outflow opening) or is actuated and activated by an ECU. The latter for example can be effected at a specifiable point in time after activation of the gas generator. For example, the means for lowering the internal pressure comprises one or more outflow openings which e.g. are formed self-adaptive or whose outflow cross-section can be controlled actively (e.g. via a corresponding actuator).

Suitable means for lowering the gas bag internal pressure are described e.g. in the German Patent Applications DE 10 2005 039 418.3 of 16 Aug. 2005 and DE 10 2006 010 953.8 of Mar. 3, 2006, to which reference in so far is made expressly.

In a second exemplary aspect, the invention relates to a gas bag arrangement comprising
  a gas bag which for the protection of a person present outside the vehicle can be deployed along at least a section of the front window and/or another portion of an outside of the motor vehicle; and
  a means for moving at least a section of the inflated gas bag out of the field of view of the vehicle operator, wherein the means includes at least one connecting element which is connected with the gas bag and connectable with the vehicle, and wherein
  the means comprises a guiding device in which the connecting element is at least partly guided along an edge of the inflated gas bag.

The gas bag arrangement according to the second aspect of the invention thus need not necessarily include the housing of the first aspect of the invention as explained above.

The gas bag in particular includes two congruent gas bag layers (material layers) which define the inflatable volume of the gas bag. In the condition of the non-inflated gas bag spread out flat, the two gas bag layers lie one on top of the other, with the circumference of the gas bag layers defining the "edge" of the gas bag. In particular, the two gas bag layers are connected with each other via a circumferential seam which extends along their edge, so that the circumference of the gas bag layers also defines the edge of the inflated gas bag. Along at least a portion of this edge of the gas bag, i.e. in particular along the circumferential seam, the connecting element extends (e.g. designed strap-like or rope-like).

According to a development of the invention, the connecting element is guided by means of a guiding device at least partly along a portion of the edge of the inflated gas bag, which extends at least approximately parallel to a plane defined by the transverse vehicle direction and vehicle height direction and/or parallel to a plane defined by the longitudinal vehicle direction and the vehicle height direction. In particular, a first portion of the connecting element extends along an upper section of the gas bag edge (which extends parallel to a plane defined by the transverse vehicle direction and vehicle height direction) and a second portion extends along a lateral section of the gas bag edge, wherein the second portion in particular extends on the driver side and parallel to a plane defined by the longitudinal vehicle direction and the vehicle height direction.

In addition, the guiding device can include at least one loop protruding from the inflated gas bag, through which the connecting element is guided. It is conceivable that the portion of the connecting element extending along the gas bag edge is guided in a single, continuous loop. It is, however, also possible that the guiding device includes a plurality of loops spaced from each other.

The at least one loop is e.g. a separate part which is connected with the gas bag. It is, however, also conceivable that the loop(s) is(are) formed integrally with the gas bag, e.g. as extension of at least one of the two gas bag layers.

The means ("retracting means") for moving at least one section of the inflated gas bag in particular is formed as described above with respect to the first aspect of the invention. For example, the connecting element is formed to be elastic. It is also conceivable that the retracting means is formed to be self-controlling, wherein e.g. a retraction mechanism of the retracting means includes an elastic element (e.g. a spring) coupled with the connecting element, which is tensioned on deployment of the gas bag. What is also possible is an active retraction mechanism which can be triggered e.g. via an ECU signal, as already described above.

The invention also relates to a vehicle with a gas bag arrangement formed as described above.

BRIEF DESCRIPTION OF THE DRAWINGS

The invention will subsequently be explained in detail by means of exemplary embodiments with reference to the Figures.

FIG. 6 shows a gas bag arrangement in the activated condition according to a further exemplary embodiment.

FIG. 7 shows a variant of a retraction mechanism of a retracting means in an exploded representation.

FIGS. 8A to 8C show a configuration of a pressure reducing device.

DETAILED DESCRIPTION

Figure 1:
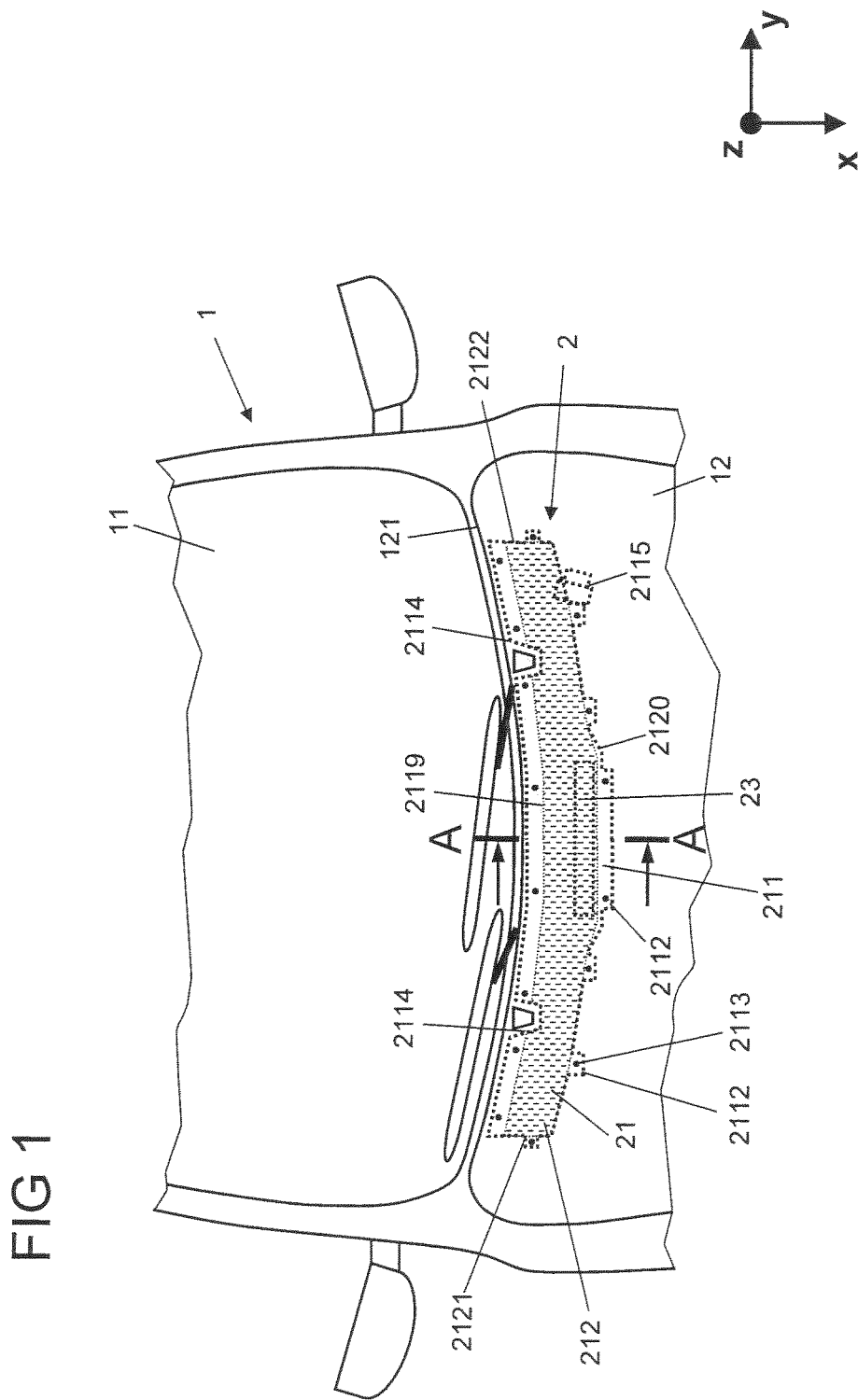
FIG. 1 shows a top view of a motor vehicle with a gas bag arrangement of the invention according to an exemplary embodiment of the invention.
Figure 2:
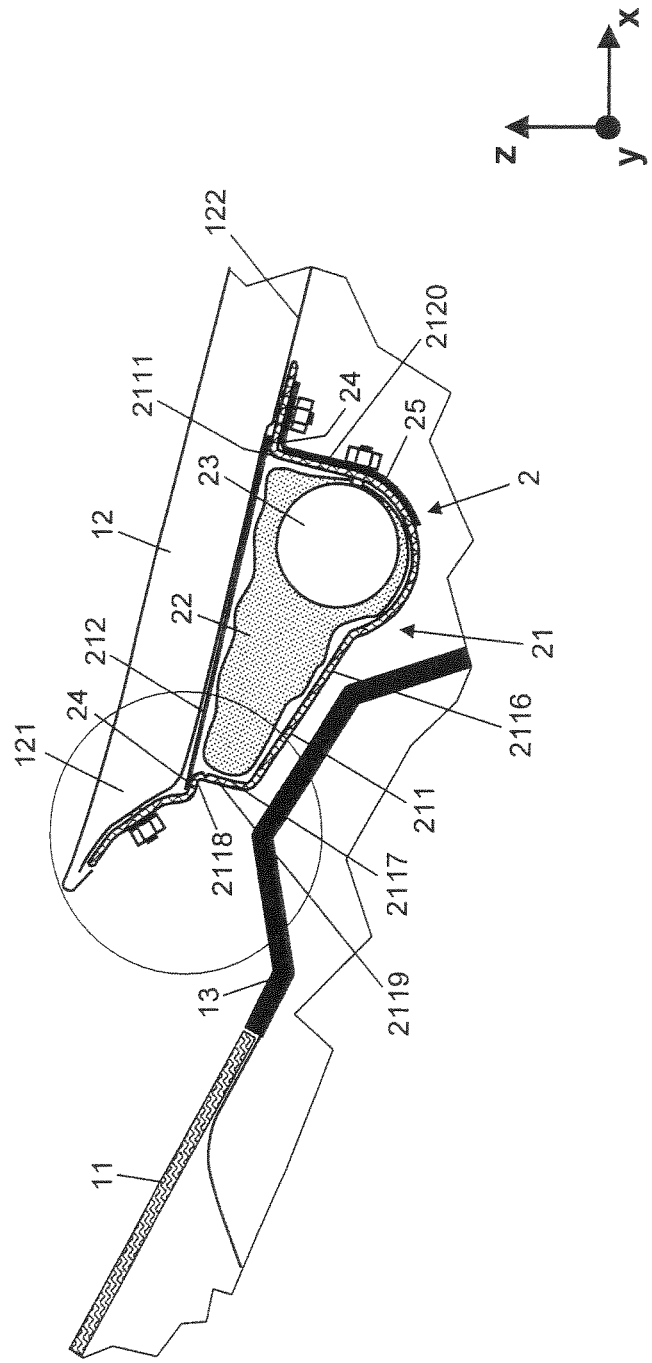
FIG. 2 shows a sectional view through the vehicle of FIG. 1.

FIG. 1 shows a top view of a gas bag arrangement according to the invention in the form of a gas bag module 2, which is arranged at a motor vehicle 1. The gas bag module 2 is arranged in the transition region between a front window (windshield 11) and a cover in the form of a hood 12 of the vehicle. More exactly, in the non-activated condition the complete gas bag module 2 is located below the hood 12, namely along an edge region 121 of the hood 12 facing the windshield 11, so that the gas bag module 2 has its largest extension substantially transversely to the longitudinal vehicle direction x (direction of travel). FIG. 2 shows a section through the vehicle along A-A in FIG. 1. Towards the engine compartment of the vehicle, the windshield 11 is adjoined by a cowl 13.

In principle, it is also conceivable that the gas bag module 2 at least partly extends above the hood. In this case, the region of such gas bag module (in particular of the housing) located above the hood is designed e.g. different from the arrangement below the hood, since other requirements must be satisfied e.g. with regard to the design and/or the aerodynamics.

The gas bag module 2 includes a housing 21 in which a folded gas bag 22 (e.g. in the form of a gas bag package) as well as a gas generator 23 for inflating the gas bag 22 are located. The housing 21 comprises a first and a second housing part 211, 212, wherein the first housing part 211 is formed with a higher dimensional stability than the second housing part 212. The second housing part 212 (hatched region in FIG. 1) covers an opening 2111 in the first housing part 211, wherein the opening 2111 serves as insertion opening via which the gas bag 22 is inserted into the housing 21.

For accommodating the folded gas bag 22, the first housing part 211 is provided with a trough-like depression which has a bottom 2116 facing away from the hood 12, which is completely surrounded by a circumferential side wall 2117 extending from the bottom 2116 in direction of the hood 12. In its region facing the windshield 11, the bottom region 2116 includes a first portion extending substantially flat, to which a second portion provided with a curvature is adjoined, wherein the curved second portion forms a receptacle in which the gas generator 23 is arranged. An upper edge 2118 of the circumferential side wall 2117 defines the opening 2111, which based on the condition of the gas bag module 2 mounted in the vehicle is closed by the second housing part 212.

The circumferential side wall 2117 has a first region 2119 (deployment region) facing the windshield 11, which extends substantially transversely to the direction of travel x, a second region 2120 spaced from the first region in direction of travel x, which likewise extends transversely to the direction of travel x and faces away from the windshield 11, and two side regions 2121, 2122 connecting the first and the second region 2119 and 2120 with each other. The side regions 2121, 2122 extend substantially in direction of travel x and are spaced from each other transversely to the direction of travel.

The two housing parts 211, 212 in particular are cohesively connected with each other, for example via a connecting region in which portions of the first and the second housing part 211, 212 overlap each other. The connecting region comprises an abutment portion 24 of the first housing part 211, which in a flange-like manner protrudes from the upper edge 2118 of the circumferential side wall 2117 of the first housing 211 and is formed e.g. at least approximately flat, and is bent from the circumferential side wall 2117 at least approximately at right angles and extends parallel to the hood 12.

The connection of the housing parts 211, 212 in particular is made tight, in order to protect the module components located in the housing against the influence of moisture and foreign objects. For example, a gas bag module designed in this way has the degree of protection IP5K7 and upwards. In this connection, reference is made to DIN 40050-9:1993-05 and ISO 20653:2006-08.

For weight reasons, for example, both housing parts 211, 212 can be made of plastics. Since the second housing part 212 will be covered (e.g. completely) by stable portions of the hood 12, the design requirements of the second housing part 212 as regards strength and dimensional stability are relatively low. In particular, as mentioned above, the protection of the parts of the gas bag module located in the interior of the housing against environmental influences, until the gas bag module is mounted in the vehicle, and the sealing of the housing interior during the service life of the vehicle will be realized by the second housing part 212. This opens up the possibility to design the second housing part 212 with less dimensional stability than the first housing part 211, for example as PE film, which likewise can contribute to a weight reduction.

The first housing part 211 includes fastening structures in the form of fastening extensions 2112 which protrude from the edge 2118 of the first housing part 211 and which including mounting holes 2113, wherein the first housing part 211 (and hence the entire gas bag module 2) is attached to the hood 12 via the mounting holes 2113. Some of the fastening extensions 2112 are formed like tabs, wherein for example their width along the edge 2118 of the first housing part 211 approximately corresponds to their length vertically to the edge 2118 of the first housing part 211 or is smaller than the length. Others of the fastening extensions 2112 are formed like flanges, i.e. their width along the edge 2118 of the first housing part 211 is distinctly greater than their length vertically to the edge 2118 of the first housing part 211. For example, the width amounts to at least three times the length.

In addition, in the region of the fastening extensions 2112 the hood 12 includes reinforcements (stiffening/reinforcement parts 122) on which threaded bolts are arranged, which protrude through the mounting holes 2113 in the first housing part 211 and are provided with nuts. Instead of a screw connection, the design of the attachment of the first housing part 211 to the hood 12 also can be completed or replaced by other types of attachment. One example is the design of the connection as latching connection.

The first housing part 211 furthermore is provided with cutouts 2114 for assemblies (e.g. the nozzles of the washer system and/or its tubings) arranged at the hood 12 and with at least one receptacle 2115 for sub-assemblies to be integrated into the gas bag module 2. Such sub-assembly for example might be a receptacle (housing) of a retraction mechanism for retracting the deployed gas bag (as explained below in connection with FIG. 4) or an actuator system for lowering the gas bag internal pressure (as likewise explained below).

The attachment of the first housing part 211 to the hood is effected such that the opening 2111 which serves for introducing the folded gas bag 22 and the gas generator 23 into the housing 2 faces the hood 12. In particular, the opening 2111 is at least almost completely covered by the hood 12, so that the hood 12 also offers a mechanical protection of the mounted gas bag module.

With a corresponding design of the gas bag module 2, especially of the first housing part 211, it can stiffen the hood 12 such that no additional effort is required in this respect for supporting the gas bag module, or the effort can be reduced as compared to already known gas bag modules. In other words, the housing 2 of the gas bag module 1 itself can act as stiffening element or support itself.

Due to increased loads in particular of the first housing part 211 in the region of the gas generator 23 during its activation, a reinforcement plate 25 can be provided. The reinforcement plate 25 in particular is fixed at one or more of the fastening extensions 2112, wherein it is clamped e.g. between the nuts utilized for attaching the first housing part 211 to the hood 12 and the first housing part 211. The reinforcement plate 25 e.g. is designed such that it also serves for attaching the gas generator 23 (and thus the gas bag 22) to the first housing part 211. This is accomplished e.g. by means of threaded bolts, which protrude from the gas generator 23, and nuts which are in engagement with the same. In addition, a means for grounding the gas bag module 2 can be provided at the reinforcement plate 25.

Figure 3:
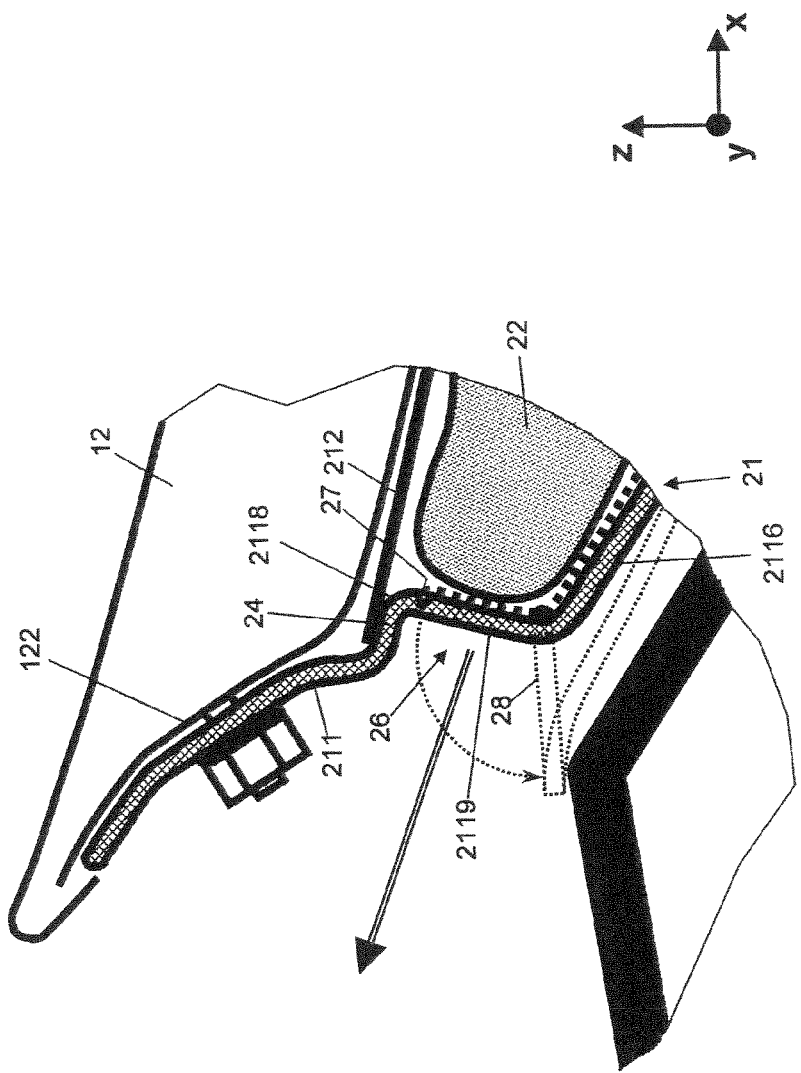
FIG. 3 shows a detail view of FIG. 2.

FIG. 3 shows a detail view of the exemplary embodiment shown in FIGS. 1 and 2, namely in the edge region 121 of the hood 12 facing the windshield 11. FIG. 3 exemplifies possible courses of tear regions which tear open under the pressure of the deploying gas bag and clear an opening through which the gas bag can exit from the housing 21.

In principle, it is possible to produce an opening for the deploying gas bag by destroying the connection between the first and the second housing part 211, 212. Since this, as explained above, preferably is a cohesive connection, problems as regards e.g. the reproducibility may occur, however, when destroying this connection. For example, despite an identical action of force the separation of the connection might be effected at different points, which would result in a different deployment behavior of the gas bag.

Therefore, it may be expedient to form the tear region by weakenings in the first housing part 211, e.g. adjacent to the connecting region, via which the first and the second housing part 211, 212 are connected with each other, i.e. adjacent to the abutment portion 24 of the first housing part 211. The weakenings define the opening which is formed by the deploying gas bag (along the direction indicated by an arrow in FIG. 3). In particular, a tear region 26 is incorporated by weakenings 27 (predetermined breaking regions) in the side wall region 2119 of the first housing part 211 facing the hood 12. The weakenings 27 extend in a line-shaped manner (continuously or with interruptions) and e.g. are formed in the form of depressions, with the weakenings 27 forming the tear region in their entirety.

For example, a weakening 27 in the side wall region 2119 extends along the upper edge 2118, i.e. the weakening 27 extends substantially in transverse vehicle direction and in the vicinity (e.g. with a distance of less than 10 mm) of the upper edge 2118. The weakening 27 also can extend into the side regions 2121, 2122 of the first housing part 211 and/or into a transition region (having a curvature) between the region 2119 and the side regions 2121, 2122.

Further weakenings 27 (shown in FIG. 3 in bold dots) extend in direction of the bottom 2116, wherein they extend (e.g. for the most part) in the side wall region 2119 and e.g. also extend into the bottom 2116 of the first housing part 211. Alternatively, the weakenings 27 can extend in the side regions 2121, 2122 arranged adjacent to the side wall region 2119 and to the bottom 2116 and in the corresponding transition regions, respectively.

In a first variant, the weakenings which form the tear region in the first housing part 211 end in the vicinity of the bottom 2116, but do not extend into the bottom 2116. The opening for the deploying gas bag here substantially is cleared only by a swiveling portion 28 (shown dotted in FIG. 3) of the side wall region 2119. In a second variant, the weakenings extend into the bottom 2116 and further in direction of the gas generator 23. Hence, along with the side wall region 2119 parts of the bottom 2116 of the first housing part 211 also can be swiveled for clearing the opening for the deploying gas bag.

Figure 4:
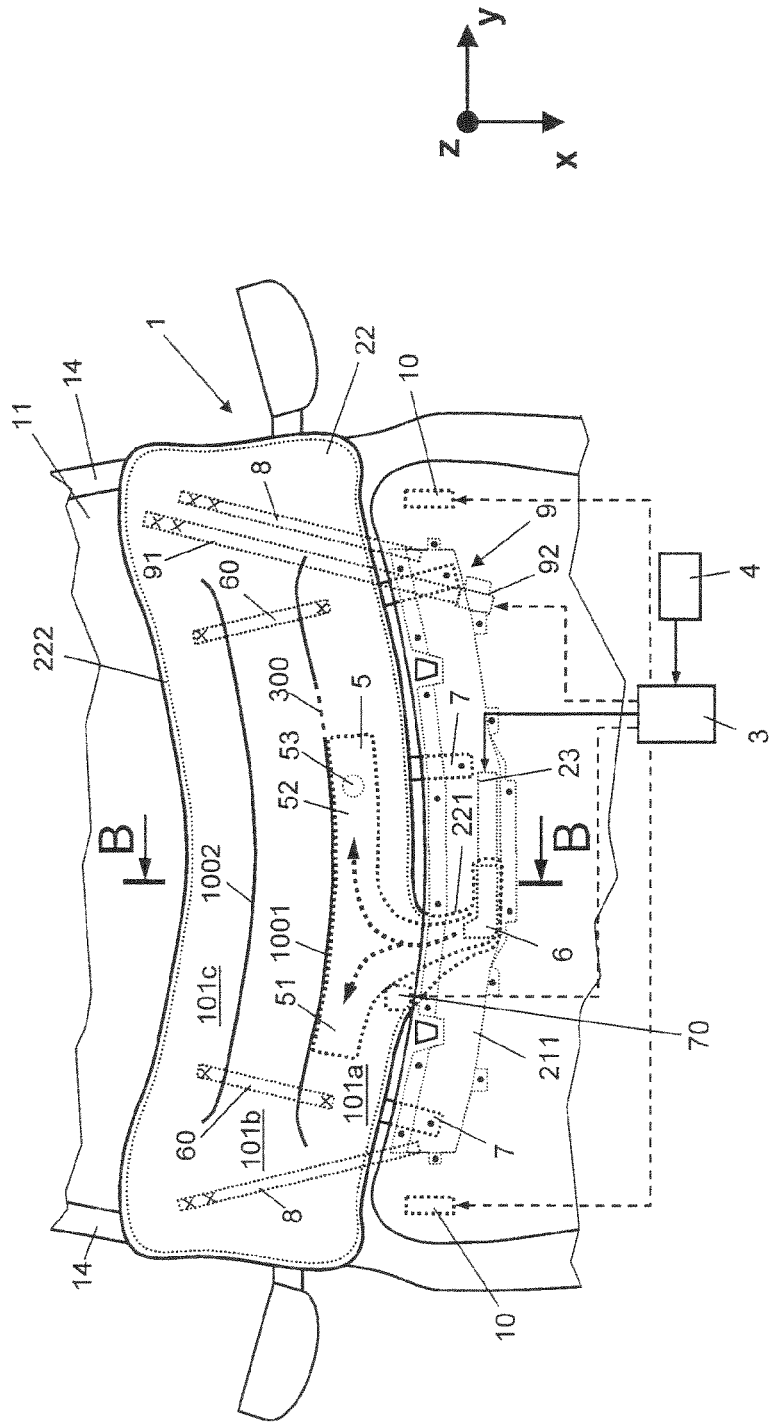
FIG. 4 shows the gas bag arrangement according to the invention as shown in FIG. 1 after activation of the gas bag.
Figure 5:
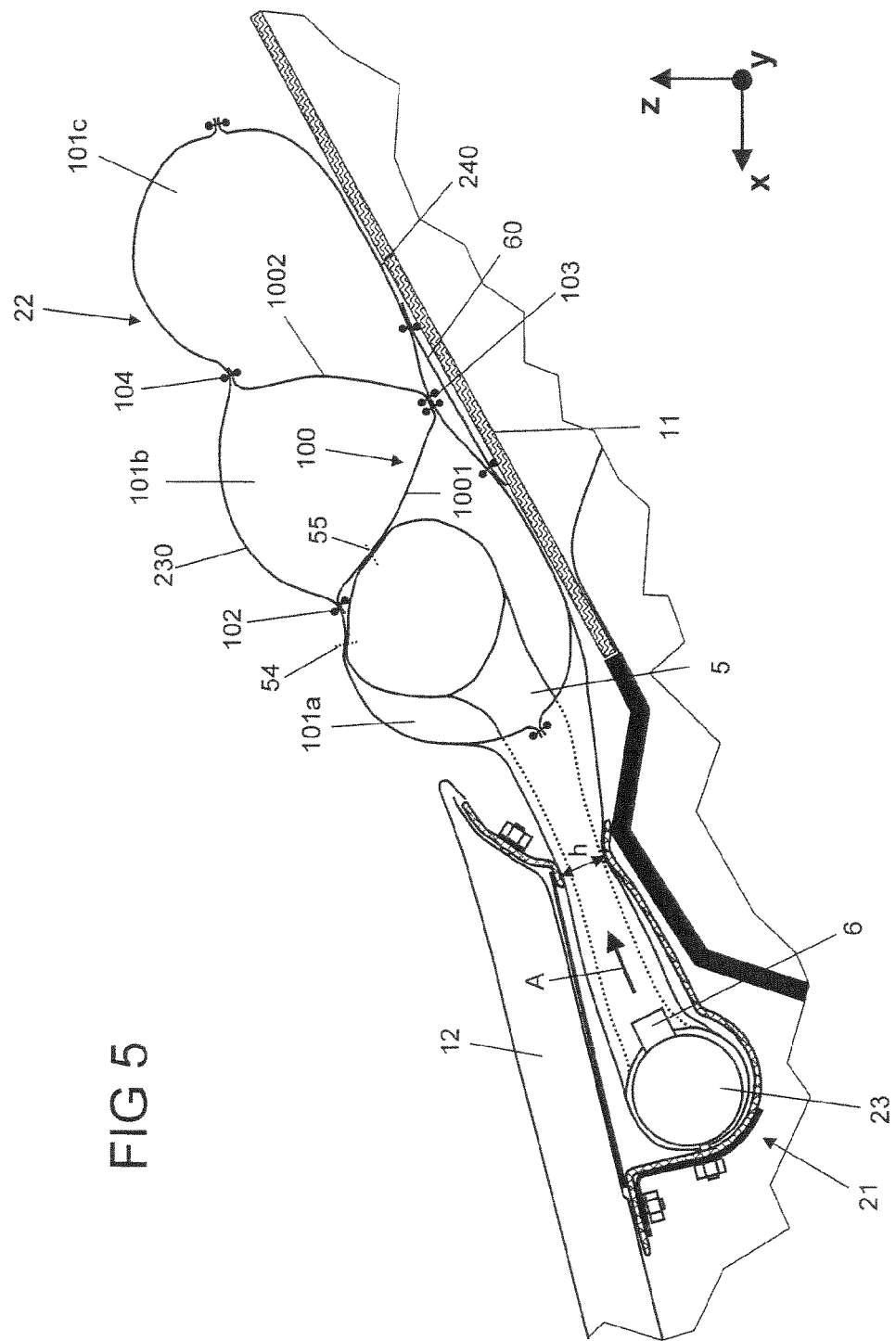
FIG. 5 shows a sectional view through the vehicle of FIG. 4.

FIGS. 4 and 5 show the gas bag arrangement 1 according to the invention in the activated condition, i.e. with inflated gas bag 22, wherein FIG. 4 shows a top view of the vehicle with the gas bag arrangement and FIG. 5 shows a sectional view (along B-B in FIG. 4).

Inflating the gas bag 22 via the gas generator 23 is effected in dependence on a control signal of an ECU 3, wherein parameters concerning the vehicle condition, which are detected by sensors 4, are processed by the ECU 3. If in the case of a directly imminent or already started collision with a person present outside the vehicle determined or stored threshold or limit values are exceeded, the ECU 3 generates a control signal for activating the gas generator 23, whereupon the gas bag 22 is inflated by the gases generated by the gas generator 23.

A region of the gas bag 22 which protects a person impacting on the vehicle in a collision (the protective region of the gas bag, i.e. in particular that region of the gas bag which extends across the windshield 11 and a portion of the hood 12 facing the windshield 12 and the remaining front vehicle body) for example is located completely outside the engine compartment covered by the hood. The protective region of the gas bag 22 in particular covers the lower region of the windshield 11 as well as regions of the two A-pillars 14 of the vehicle adjacent to the windshield 11. Furthermore, to reduce its thickness, the protective region of the gas bag vertical to the windshield can be provided with inner separating elements 1001, 1002, e.g. in the form of catch straps (or portions of a catch strap) or dividing walls which divide the protective region into several (here three) chambers, as will yet be explained below. In their largest extension ("main direction of extension") the chambers extend substantially vertically to the direction of travel x, i.e. the main direction of extension of the chambers substantially extends in transverse vehicle direction, wherein the course of the chambers can be adapted to a curvature of the windshield 11.

The chambers of the gas bag 22 also can be in flow connection with each other, e.g. via their ends facing the A-pillars 14 of the vehicle. Optionally, the dividing walls between the chambers can be provided with overflow regions 300. The gas bag is filled via a blow-in region 221, which can be arranged both centrally and eccentrically (with respect to the main direction of extension of the inflated gas bag 22, which extends substantially in transverse vehicle direction) and which is connected with the gas generator 23.

Proceeding from the gas generator 23 a flexible gas conducting means 5 extends in the interior of the blow-in region 221, which extends up into the protective region of the gas bag 2 and for a better filling of the outer regions of the protective region of the gas bag is branched there in the manner of a T-branch, i.e. includes a first portion 51 extending along the transverse vehicle direction and a second portion 52 extending substantially opposite thereto. In the region of its outflow openings the gas generator 23 is provided with a further (in particular rigid) gas conducting means 6, which directs the released gases in direction of the protective region of the gas bag 22. In the present case, the gas conducting means 5 each includes a gas outlet opening at its two end regions. If necessary, gas outlet openings 53 also can be provided at the regions located in between. It is of course also conceivable that the further gas conducting means 6 is formed separate from the gas conducting means 5, but likewise is made of a flexible material (e.g. a textile material, such as a gas bag fabric). It is also possible that instead of the separate gas conducting means 5, 6 a single gas conducting means is used.

The gas bag 22 in particular is formed of two e.g. substantially congruent blanks (upper and lower part), which are connected with each other in their edge regions by means of a circumferential seam 222. To improve the gas tightness under load, the circumferential seam 222 can additionally be sealed by special measures, for example by a coating with silicone. The blow-in region 221 and the protective region of the gas bag are an integral part of the two blanks.

Transversely to the direction of travel x and in particular adjacent to the blow-in region 221 of the gas bag 22, the protective region of the gas bag is provided with a plurality of fixing straps 7 in its edge region facing the hood 12, which are connected with the housing 21 of the gas bag module 2 and which additionally fix the gas bag 22 at the motor vehicle.

Optionally, positioning straps 8 additionally are provided at the gas bag 22, which extend between the gas bag 22 (between its protective region) and the windshield 11 (or its frame). With their one end region, the positioning straps 8 are connected with the housing 21 of the gas bag module 2. The respectively other end of the positioning straps 8 is fixed at a portion of the gas bag 22 which rests against the windshield 11. The positioning straps 8 are meant to secure the position of the gas bag 22 (in particular of its protective region) relative to the windshield 11 and to the A-pillars 14, respectively, even if a force introduced by an impacting person acts on the gas bag 22.

Furthermore, the gas bag arrangement according to the invention can include a means (retracting means) for moving the inflated gas bag out of the field of view of the vehicle operator. The retracting means preferably is arranged on the driver side (also possible on driver and passenger side) and after the deployment of the gas bag 22 and the possible impact of a person should again provide for the forward view, especially for the vehicle operator.

The retracting means can be designed to be both self-controlling and actuatable and activable by a control unit (ECU). For example, a retracting means 9 is provided, which comprises a connecting element in the form of a retracting strap 91, which with one end is connected with the gas bag 22 (namely on its side facing the windshield 11). The other end of the retracting strap 91 is coupled with a retraction mechanism 92 arranged in the housing 21 of the gas bag module 2.

In the self-controlling design of the retracting means 9, the retracting means 9 comprises restoring force generating means in the form of a retraction mechanism 92, which includes e.g. a winding spool with a spiral spring. During deployment of the gas bag 22 a force is produced by the pressure building up in the gas bag interior, which is transmitted to the winding spool via the retracting strap 91, so that the spiral spring is tensioned. The spiral spring is unwound in the process. When the gas bag internal pressure drops, the force transmitted to the winding spool is reduced, whereupon the spiral spring is wound up again (is tensioned) and thereby withdraws the retracting strap 91 and hence the gas bag 22 from the field of view of the vehicle operator. When the retracting means 9 is designed such that it is triggered by a signal of the ECU 3, the retraction mechanism 92 includes e.g. an actuator which realizes the retraction operation. As actuator, an electric motor which drives the winding spool or a pyrotechnically driven piston-cylinder unit might be provided, for example.

In addition, independent of the design of the retracting means (self-controlling or actuated by ECU) a means 70 for lowering the gas bag internal pressure can be integrated into the gas bag module 2. By such a means, another course can be imparted to the decrease of the gas bag internal pressure after a certain time, so that the force to be applied for retracting the gas bag 22 is reduced, as already explained above.

The means for lowering the gas bag internal pressure likewise can be formed to be self-controlling (e.g. as self-adaptive outflow opening) or be actuated and hence activated by a control unit (ECU). The latter for example can be effected at a fixed point in time after activation of the gas generator.

With sufficient installation space, the gas bag module 2 also can be designed such that the gas bag 22 is able to deploy through an existing gap between the edge region of the hood 12 facing a windshield 11 and the vehicle structure disposed thereunder. If the gap is not sufficient, a means for lifting the hood 12 can be provided. The same can comprise the gas bag 22 itself, wherein in one variant the lifting of the hood 12 is made possible by a selective deformation of the hinge connection of the hood 12. In another variant, the hood 12 is unlocked in the region of the hinges before lifting, namely by means of a device actuated by the ECU 3. Alternatively or in addition, the means for lifting the hood 12 can comprise a separate device 10 (e.g. in the form of a linearly movable actuator) for lifting the hood, which likewise can be actuated by the ECU 3.

FIG. 5, as mentioned, shows a section through the gas bag arrangement according to the invention as shown in FIG. 4. In the view of FIG. 5 it can be seen that the gas bag 22 includes three chambers 101a-c which extend one behind the other along the windshield 11. The division of the gas bag 22 into the chambers 101a-c is effected by separating elements 1001, 1002 in the form of portions of a catch strap 100, which proceeding from an upper blank (upper part 230) extends to a lower blank (lower part 240) of the gas bag 22 and back again. Instead of the one-piece catch strap 100, it is also possible to use several (in particular two) separate catch straps.

The catch strap is fixed at the blanks 230, 240 via seams 102-104, wherein two end portions of the catch strap 100 are connected with regions of the upper blank 230 spaced from each other and a middle portion of the catch strap 100 is connected with the lower blank 240. In the sectional view of FIG. 5 a V-shape of the catch strap 100 thus is obtained, wherein a first portion 1001 ("first separating element") of the catch strap 100, which extends between the seam 102 and the seam 103, extends along a first plane and a second portion 1002 ("second separating element"), which extends between the seam 104 and the seam 103, extends along a second plane which is oriented at an angle to the first plane. Due to this V-shaped course of the catch strap 100, the middle chamber 101b in particular in its region facing away from the windshield 11 assumes a shape by which the two adjacent chambers 101a, 101c are pressed against the windshield 11. The middle chamber 101b itself e.g. at least partly has no contact to the windshield 11.

This shaping of the gas bag 22 can be supported by a plurality of strap-like or single-layer connections 60 which span over the middle chamber 101b and connect its adjacent regions (e.g. the chambers 101a, 101c) with each other and brace the same against each other. This design in particular facilitates the positioning of the protective region of the gas bag 22 at the windshield 11, which e.g. provides for omitting the positioning straps 8 described in conjunction with FIG. 4.

In the case of gas bag arrangements in which the hood is not lifted by the gas bag, the forces which the gas bag introduces into the hood should be kept as low as possible. Beside other measures (e.g. folding the gas bag) the dimensioning of those parts of the gas bag therefore is important which in its deployed condition lie in the region of exit from the hood. In the gas bag module 2 according to the invention, in particular the blow-in region 221 of the gas bag 22 and the part of the flexible gas conducting means 5 extending therein are designed correspondingly. Both for example are dimensioned such that their extension in the filled condition of the gas bag 22 vertically to the flow direction (arrow A) of the gases directly after exit from the fixed gas conducting means 6 and vertically to the hood 12 approximately corresponds to the lowest passage height h (e.g. distance between hood 12 and a vehicle structure disposed thereunder or between an upper portion of the first housing part 211 and a lower portion of the first housing part 211 located opposite to the upper portion vertically to the deployment direction of the gas bag) for the gas bag during its deployment. Exceeding said dimension is possible when plastic deformations of the hood during deployment of the gas bag largely are avoided.

The flexible gas conducting means 5 is dimensioned such that in the filled condition a region thereof which is located in the protective region (i.e. in particular outside the inflation orifice 221) can rest against parts (e.g. catch straps such as the catch strap 100) located in the gas bag interior and/or regions of the outer envelope (the upper and the lower blank 230, 240) of the gas bag 22. This contact for example prevents that the flexible gas conducting means 5 moves in an uncontrolled way (flaps around) when filling the gas bag 22. Alternatively or in addition, the flexible gas conducting means 5 can be fixed at the gas bag 22 (e.g. by seams).

FIG. 6 relates to a further aspect of the connecting element designed as retracting strap 91. One end of the retracting strap 91 likewise is connected with the vehicle via a retraction mechanism 92. In contrast to FIG. 4, however, the other end of the retracting strap 91 is not fixed at a middle region of the inflated gas bag, i.e. it is not fixed on a (flat) side of the gas bag 22 facing the windshield 11.

Rather, a part of the retracting strap 91 extends along an outer edge 223 (i.e. along the circumferential seam 222) of the gas bag 22, wherein a first portion 911 of the retracting strap 91 extends along an upper portion 2231 of the gas bag edge 223 and a second portion 912 of the retracting strap 91 extends along a lateral portion 2232 of the gas bag edge 223. The upper portion 2231 of the gas bag edge 223 is that one of the two edge portions of the gas bag 22 extending parallel to a plane defined by the transverse vehicle direction and the vehicle height direction, which is furthest away from the hood 12. The lateral portion 2232 extends in the region of the driver side of the vehicle and in particular extends parallel to a plane defined by the longitudinal vehicle direction and the vehicle height direction and extending through the A-pillar of the vehicle.

The end 9121 of the retracting strap 91 adjoining the second portion 912 is fixed at the gas bag 22 in its lateral edge portion 2232 or at a lower edge portion 2233 of the gas bag 22. A portion 913 of the retracting strap 91 extending between the retraction mechanism 92 and the first portion 911 of the retracting strap 91 extends in a middle region of the gas bag 22 relative to the transverse vehicle direction and transversely to the extension of the gas bag 22 in transverse vehicle direction, wherein the first portion 911 of the retracting strap 91 adjoins the portion 913 at an angle (or curved); for example, the portion 913 and the first portion 911 extend almost vertically to each other.

The portions 911, 912 of the retracting strap 91 extending along the edge portions 2231, 2232 of the gas bag 22 are guided by means of a guiding device formed of a plurality of loops 400. The loops 400 are arranged at a distance from each other, wherein they have e.g. a constant distance a from each other. For example, the distance a is 50 to 100 mm, in particular about 75 mm. The width b of the loops is e.g. not more than 30 mm, e.g. between 10 and 30 mm, in particular about 25 mm, wherein in particular between 10 and 20 loops are provided. It is of course not absolutely necessary that the loops 400 are arranged at constant distances from each other. In addition, it is also possible that the loops 400 have not identical, but different widths.

In particular, the width of the loops is dimensioned such that when hauling in (retracting) the retracting strap 91 (in retracting direction R) they are moved towards each other, e.g. until they rest against each other, so that the gas bag 22 is pleated, i.e. the gas bag regions located between the loops 400 are gathered, and the gas bag 22 thus is removed from the viewing region of the vehicle operator as efficiently as possible. The length of the retracting strap 91 (in particular the length of the portion of the retracting strap 91 to be retracted by the retraction mechanism 92) as well as the distance a and/or the width b of the loops 400 to each other are adjusted to the desired end position of the gas bag 22 after retraction.

It should be noted that elements of the exemplary embodiments described above can of course also be used in combination with each other. For example, the flexible gas conducting means 5 of FIG. 4 can also be used in the exemplary embodiment of FIG. 6.

FIG. 7 shows a detailed exploded representation of a variant of a retraction mechanism 92 of the retracting means 9 accommodated in a two-part housing (cf. FIG. 4). Accordingly, the retraction mechanism 92 includes a winding means in the form of a winding spool 921 arranged in a first housing part 9211, at which an end of the retracting strap 91 is fixed. The winding spool 921 cooperates with a spiral spring 914 via a shaft 915, wherein an inner end 9141 of the spiral spring 914 engages in an end region (slot 9131) of the shaft 915. The spiral spring 914 is accommodated in a second housing part 9212, wherein the second housing part 9212 is fixed at a flange region 9213 of the first housing part 9211.

With its other, opposite end 9132 the shaft 915 is non-rotatably connected with the winding spool 921. During deployment of the gas bag 22, the retracting strap 91 is unwound from the winding spool 921. Via the shaft 915, the resulting rotary movement of the winding spool 921 is passed on to the spiral spring 914 (to its inner end 9141), whereby the same is wound up and hence tensioned. With increasing unwinding length of the retracting strap 91, the restoring force exerted on the gas bag 22 thus is increasing. FIGS. 8A to 4B relate to a variant of a means for lowering the gas bag internal pressure (pressure reducing device) 70, wherein FIGS. 8A and 8C show various sectional representations and FIG. 8B shows a top view of the pressure reducing device 70.

FIG. 8A and FIG. 8B represent the starting situation, i.e. the condition of the gas bag 22 and the pressure reducing device 70 before activation of the pressure reducing device 70. The gas bag 22, however, has already been filled with the gas released by the gas generator 23 after ignition thereof and has deployed out of the module housing 21 along the windshield of the vehicle.

The pressure reducing device 70 comprises an outflow opening 71 of the gas bag 22, which is closed by a portion (covering member 721) of a covering device in the form of an inflatable element 72 extending along the inflated gas bag 22 in a channel-like manner. Along the edge region of the gas bag 22 surrounding the outflow opening 71, the inflatable element 72 is connected with the gas bag 22 by means of at least one releasable connection 73 (e.g. in the form of at least one tear seam). For example, the connection 73 extends around the outflow opening 71. In addition, at least one firm connection 75 can be provided between the inflatable element 72 and the gas bag 22. With its end 722 facing away from the covering member 721 the inflatable element 72 is fixed to be firmly mounted on the vehicle (e.g. on the module housing 21).

The pressure reducing device 70 furthermore includes a gas providing means in the form of an (in particular pyrotechnical) gas source 74 different from the gas generator 23 for inflating the inflatable element 52. The inflatable element 72 correspondingly is arranged on the vehicle such that the gas source 74 is in flow connection with an inflatable volume of the inflatable element 72. The inflatable volume of the inflatable element 72 in particular is defined by two firmly connected connecting regions (in particular opposed to each other) of two material layers (e.g. of a gas bag material). The material layers in particular are connected with each other via a seam 76, wherein the seam 76, which with an upper portion likewise extends around the outflow opening 71, defines the inflatable volume of the inflatable element 72. Suitable configurations of the inflatable element are described in the German Patent Application DE 10 2010 039 895, to which reference is made in so far.

FIG. 8C shows the situation after activating the pressure reducing device 70, i.e. after triggering the gas source 74. The load of the connections 73 caused by the action of the pressure building up in the inflatable element 72 by filling with gas of the gas source 74 and e.g. also by the high temperature of the inflowing gases finally leads to the destruction thereof, so that the inflatable element 72 is moved away from the gas bag 22 at least in the region of the outflow opening 71 and thus clears the outflow opening 71. Thereupon, gas flows off from the interior of the gas bag 22 to the outside, which effects a reduction of the gas bag internal pressure.

According to FIG. 8C, the connection between the inflatable element 72 and the gas bag 22 via the additional firm connection 75 also is maintained after activating the gas source 74. It is, however, also conceivable that the connection 75 also is formed to be releasable (in particular likewise as tear connection), so that the gas bag 22 is detached over a larger surface (e.g. completely from the inflatable element 72).

The invention claimed is:
1. A gas bag arrangement for a motor vehicle, comprising:
a gas bag which can be deployed for the protection of a person present outside the vehicle along at least a section of a front window and/or another portion of an outside of the motor vehicle; and
a housing in which the gas bag is arranged, wherein the housing is different from a cover of a receiving region of the motor vehicle, which extends in front of the front window; and
a means for moving at least a section of the inflated gas bag out of the field of view of a vehicle operator; wherein
the housing is designed such that it at least partly covers the gas bag towards the cover of the motor vehicle-based on the situation with the gas arrangement being mounted in the vehicle, and
the housing comprises a first and a second housing part, wherein the first housing part includes an opening for introducing the gas bag into the housing and the second housing part at least partly covers the opening in the first housing part, wherein after assembly of the gas bag arrangement the second housing part covers the gas bag towards the cover of the motor vehicle, and wherein the first housing part is connected with the second housing part.

2. The gas bag arrangement according to claim 1, wherein the first housing part is formed with a higher dimensional stability than the second housing part.

3. The gas bag arrangement according to claim 1, wherein the first housing part is cohesively connected with the second housing part.

4. The gas bag arrangement according to claim 1, wherein the second housing part is formed in the form of a film.

5. The gas bag arrangement according to claim 1, wherein the first housing part forms a receptacle defined by a bottom and a side wall protruding from the bottom at an angle or vertically, in which the gas bag is arranged.

6. The gas bag arrangement according to claim 1, wherein the first housing part includes a tear region which under the pressure of the deploying gas bag clears an opening through which the gas bag can exit from the housing.

7. The gas bag arrangement according to claim 4, wherein the first housing part includes a tear region which under the pressure of the deploying gas bag clears an opening through which the gas bag can exit from the housing and the tear region is formed by a material weakening of the side wall and/or of the bottom.

8. The gas bag arrangement according to claim 1, wherein the first housing part includes at least one fastening structure via which it is connectable with the cover of the motor vehicle.

9. The gas bag arrangement according to claim 1, wherein the gas bag includes a plurality of chambers which are separated from each other by at least one flexible separating element.

10. The gas bag arrangement according to claim 9, wherein
the gas bag includes at least one first, second and third chamber which in the deployed condition of the gas bag extend one behind the other along the front window of the vehicle,
wherein the second chamber is located between the first and the third chamber, and the second chamber is separated from the first chamber via a first separating element and from the third chamber via a second separating element,
wherein the first separating element extends at least approximately along a first plane and the second separating element extends along a second plane oriented at an angle to the first plane.

11. The gas bag arrangement according to claim 1, further comprising a gas generator for inflating the gas bag and a flexible gas conducting means extending in the interior of the gas bag for conducting the gas generated by the gas generator.

12. The gas bag arrangement according to claim 1, wherein the means for moving include at least one connecting element which is connected with the gas bag and connectable with the vehicle, wherein the connecting element is formed elastic or the gas bag arrangement includes restoring force generating means via which the connecting element is connected with the gas bag or connectable with the vehicle.

13. A gas bag arrangement for a motor vehicle, comprising:
a gas bag which can be deployed for the protection of a person present outside the vehicle along at least a section of a front window and/or another portion of an outside of the motor vehicle; and
a housing in which the gas bag is arranged, wherein the housing is different from a cover of a receiving region of the motor vehicle, which extends in front of the front window; and wherein
the housing is designed such that it at least partly covers the gas bag towards the cover of the motor vehicle-based on the situation with the gas bag arrangement being mounted in the vehicle, and
the housing comprises a first and a second housing part, wherein the first housing part includes an opening for introducing the gas bag into the housing and the second housing part at least partly covers the opening in the first housing part, wherein after assembly of the gas bag arrangement the second housing part covers the gas bag towards the cover of the motor vehicle, and wherein the first housing part is connected with the second housing part,
a gas bag which can be deployed for the protection of a person present outside the vehicle along at least a section of the front window and/or another portion of an outside of the motor vehicle; and
a means for moving at least a section of the inflated gas bag out of the field of view of the vehicle operator, wherein
the means includes at least one connecting element which is connected with the gas bag and connectable with the vehicle, and wherein
the means comprises a guiding device in which the connecting element is at least partly guided along an edge of the inflated gas bag.

14. The gas bag arrangement according to claim 13, wherein the connecting element is at least partly guided along a portion of the edge of the inflated gas bag, which extends at least approximately parallel to a plane defined by the transverse vehicle direction and vehicle height direction and/or parallel to a plane defined by the longitudinal vehicle direction and the vehicle height direction.

15. The gas bag arrangement according to claim 13, wherein the guiding device includes at least one loop protruding from the inflated gas bag, through which the connecting element is guided.

16. The gas bag arrangement according to claim 15, wherein the guiding device includes a plurality of loops spaced from each other.

17. The gas bag arrangement according to claim 13, wherein the means includes a retraction mechanism for retracting the connecting element after inflating the gas bag.

18. The gas bag arrangement according to claim 1, further comprising a means for lowering an internal pressure in the gas bag.

19. A gas bag arrangement for a motor vehicle, comprising:
a gas bag which can be deployed for the protection of a person present outside the vehicle along at least a section of a front window and/or another portion of an outside of the motor vehicle;
a means for lowering an internal pressure in the gas bag, and
a housing in which the gas bag is arranged, wherein the housing is different from a cover of a receiving region of the motor vehicle, which extends in front of the front window; wherein
the housing is designed such that it at least partly covers the gas bag towards the cover of the motor vehicle-based on the situation with the gas bag arrangement being mounted in the vehicle, and
the housing comprises a first and a second housing part, wherein the first housing part includes an opening for introducing the gas bag into the housing and the second housing part at least partly covers the opening in the first housing part, and wherein after assembly of the gas bag arrangement the second housing part covers the gas bag towards the cover of the motor vehicle.

20. A gas bag arrangement for a motor vehicle, comprising:
a gas bag which can be deployed for the protection of a person present outside the vehicle along at least a section of a front window and/or another portion of an outside of the motor vehicle; and
a housing in which the gas bag is arranged, wherein the housing is different from a cover of a receiving region of the motor vehicle, which extends in front of the front window; wherein
the housing is designed such that it at least partly covers the gas bag towards the cover of the motor vehicle-based on the situation with the gas bag arrangement being mounted in the vehicle, and
the housing comprises a first and a second housing part, wherein the first housing part includes an opening for introducing the gas bag into the housing and the second housing part is formed as a film and at least partly covers the opening in the first housing part, wherein after assembly of the gas bag arrangement the second housing part covers the gas bag towards the cover of the motor vehicle.

* * * * *

UNITED STATES PATENT AND TRADEMARK OFFICE
CERTIFICATE OF CORRECTION

PATENT NO. : 9,073,513 B2
APPLICATION NO. : 13/981811
DATED : July 7, 2015
INVENTOR(S) : Kalliske et al.

Page 1 of 1

It is certified that error appears in the above-identified patent and that said Letters Patent is hereby corrected as shown below:

In the Claims

Column 14; Line 57; Claim 1;  Please insert --bag-- after gas.

Signed and Sealed this
Thirteenth Day of October, 2015

Michelle K. Lee
*Director of the United States Patent and Trademark Office*